United States Patent [19]

Bosek

[11] Patent Number: 4,936,717
[45] Date of Patent: Jun. 26, 1990

[54] ADJUSTABLE NARROW WIDTH SLOTTING CUTTER

[75] Inventor: Ronald P. Bosek, Davisburg, Mich.

[73] Assignee: GTE Valenite Corporation, Troy, Mich.

[21] Appl. No.: 285,920

[22] Filed: Dec. 19, 1988

[51] Int. Cl.⁵ .................... B23C 5/08; B23C 5/20
[52] U.S. Cl. .................... 407/31; 407/44; 407/61; 144/218; 144/237
[58] Field of Search .................... 407/31, 38, 44, 48, 407/51, 52, 58, 61; 83/875, 876, 877; 144/218, 235, 236, 237; 409/213, 217, 232, 234

[56] References Cited

U.S. PATENT DOCUMENTS

| | | | |
|---|---|---|---|
| 205,296 | 6/1878 | Peer | 407/31 |
| 2,788,812 | 4/1957 | Jacobs | 144/237 |
| 3,946,777 | 3/1976 | Heimbrand | 407/31 |
| 4,009,637 | 3/1977 | Bittner | 407/31 |
| 4,055,204 | 10/1977 | Gunzner et al. | 407/31 |
| 4,674,923 | 6/1987 | Ogilvie et al. | 407/31 |
| 4,730,962 | 3/1988 | Johannesson | 407/31 |

*Primary Examiner*—William Terrell
*Attorney, Agent, or Firm*—David J. Koris

[57] ABSTRACT

An indexable slot cutting tool for narrow widths having both head and base members with adjacent opposed cutting faces. An axially oriented sleeve with right hand differential pitch threading engages the head and base members to effect axial movement of the cutting faces for slot adjustment.

11 Claims, 5 Drawing Sheets

ADJUSTABLE NARROW WIDTH SLOTTING CUTTER

FIELD OF THE INVENTION

The present invention relates to the field of axially adjustable slot cutting tools and more particularly to indexable slot cutting tools for slot widths of less generally than 0.25 inches.

BACKGROUND OF THE INVENTION

Adjustable slot cutting tools have traditionally been available for large slot applications of 1.062 inches down to about 0.25 inches. Traditionally, the tools employ a wedge or cam arrangement which force an insert against the walls of a tool body. Axial adjustment is accomplished by retracting the wedge, indexing the insert and then repositioning the cutting edge with respect to an established datum with a set-uP fixture before the wedge is resecured.

Slot cutting tools for widths less than 0.25 inches have traditionally been limited to fixed tip designs where the cutting edge blade is brazed or welded to the tool seat. Axial adjustment is accomplished by heating the tip to the melting temperature of the braze alloy, repositioning the tip axially and radially, allowing the braze alloy to cool and then regrinding the tip to a desired tip configuration. This process is both time-consuming and costly frequently requiring the tools to be sent out for specialized reconditioning. A slot cutting tool which generates a slot of about 0.25 inches or less which is both indexable and axially adjustable would be a considerable advance in the art of slot cutting tools.

Another object of the present invention is to provide an adjustable slot cutting tool which is readily indexable requiring a minimum amount of down time.

A further object is to provide a tool is which capable of both fine adjustment down to 0.0001 inches and high precision.

SUMMARY OF THE INVENTION

Accordingly, the present invention solves the beforementioned problems by providing a cutting tool having a body rotatable about a central axis and having a forward adjustment head and a rearwardly disposed base. Both the head and base members have pockets recessed in compatible cutting faces generally normal with the axis of rotation. The pockets are concentric with the axis and allow for indexable inserts to be deposited therein and protrude peripherally. The adjustment head and base are preferably cylindrical in form and include a common bore also concentric with the rotational axis. The bore walls are threaded for receipt of a sleeve member which threadingly engages the internal threading of the head and base allowing for differential engagement. The base also includes a second narrower bore also concentric with the axis for receipt of a locking bolt. The bore also includes an aperture which extends through the base member in a direction generally normal to said axis but off center. An adjustable threaded cam member is removably inserted within the aperture and communicates with the sleeve member to provide a threaded surface for the sleeve. The sleeve member engages both the threaded head and threaded cam member of the base portions of the body and on rotation either draws the respective cutting faces together or drives them apart. The indexable inserts, fixed within pockets at the interface of the two members is thereby drawn closer together or separated resulting in a narrowing or widening of the slot.

Seated axially within a peripheral flange of the sleeve member is an end cap. The cap has a number of axially oriented legs which seat within apertures in the sleeve member. Rotation of the end cap causes rotation of the sleeve member and thereby adjustment of the cutting slot. Once the desired adjustment is made, the tool is secured from further adjustment by the locking bolt. The bolt passes through the adjustment cap, sleeve, head member and into the rearward base member bore threaded for receipt therein.

One advantage of the present invention therefore is that it is readily disassembled for indexing so that the tooling be reapplied to the same application with a minimum of down time.

Another advantage is that the combination of 20 pitch and 12 pitch threading on the differential sleeve member affords increased precision and accuracy in obtaining a slot width. For example, a 5 degree incremental rotation of the end cap results in a 0.00046 increase or decrease in width.

Yet another advantage is that the present invention does not require a setting fixture to reposition the cutting edge.

BRIEF DESCRIPTION OF THE DRAWINGS

With reference to various illustrations of the embodiments of the present invention.

DETAILED DESCRIPTION OF A PREFERRED EMBODIMENT

Figure 1:
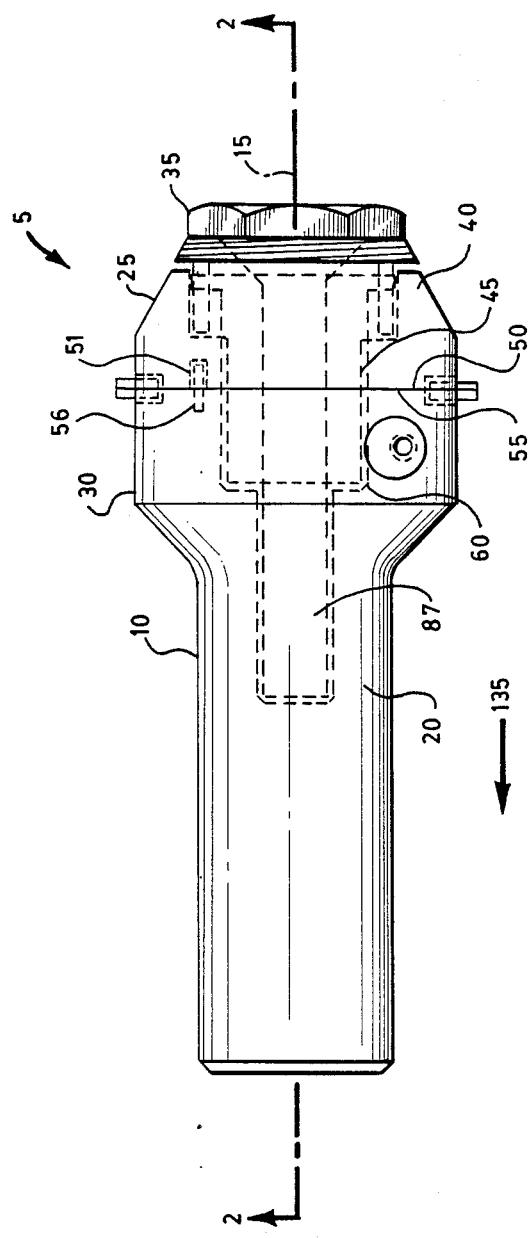
FIG. 1 is a cut away side view of the present invention.

With reference to FIG. 1, a slot cutting tool 5 is illustrated having a generally cylindrical body 10. The body is rotatably driven about a centrally disposed axis 15 by means of rearwardly positioned shank 20 in a spindle(not shown). The manner of securing shank 20 for driveable rotation is known by those skilled in the art and will not be further elaborated upon.

Body 10 is separated into forwardly disposed adjustable head member 25 and rearwardly disposed base member 30. Head member 25 includes an end cap 35, intermediate member 40 and sleeve 45 and first cutting face 50. Base member 30 includes second cutting face 55 adjacent to first cutting face 50, internal cavity 60, previously disclosed shank 20. Head member 25 and base member 30 are keyed by guide member 56 and recess 51 disposed in cutting faces 55, 60. Other means of maintaining alignment are known in the art and will not be elaborated on herein.

Figure 2:
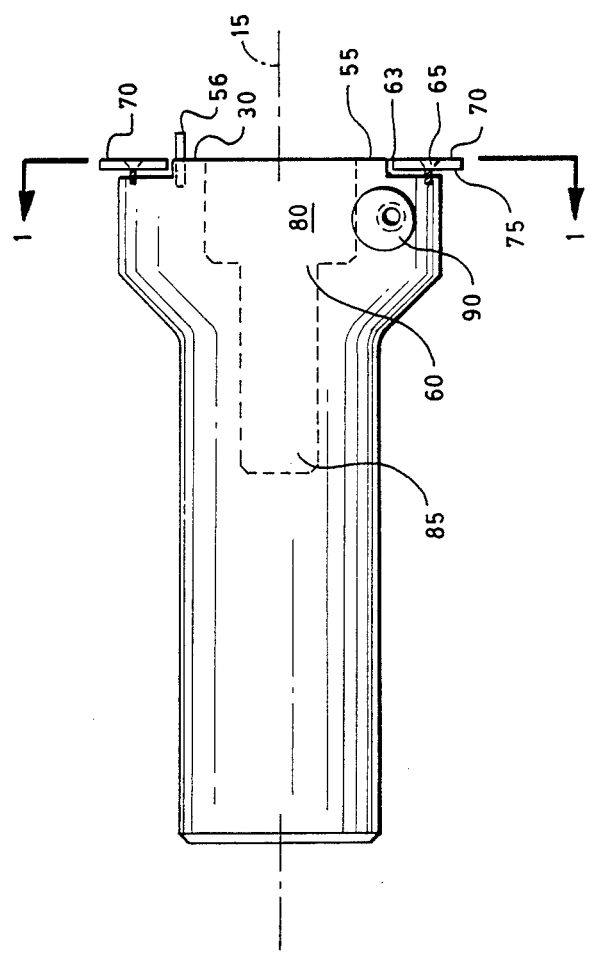
FIG. 2 is a cut away side view of the rear base member of the embodiment,,of FIG. 1.

FIG. 2 illustrates base member 30 in detail. Second cutting face 55 is generally planar in form and oriented normal to the rotational axis 15. Face 55 further includes a plurality of recessed pockets 63 which are peripherally spaced about face 55 and are threaded for receipt of a securing means such as a conical head screw 65. A number of indexable inserts 70 of wafer like form are seated within pockets 63 with respective cutting edges 75 extending radially outward from rotational axis 15. Inserts 70 may be composed of hardened materials generally known in the art such as tungsten carbide, titanium carbides, or various ceramic materials such as aluminum oxides, alumina titanium carbide, silicon carbide, boron carbide, and cubic boron nitride, or various synthetic diamond materials such as polycrystalline diamond. Preferably, the present invention uses tungsten carbide generally available from GTE Valenite under the trade name VC-2 and VC-5 due to the broad range of tooling applications afforded by these grades.

Figure 3A:
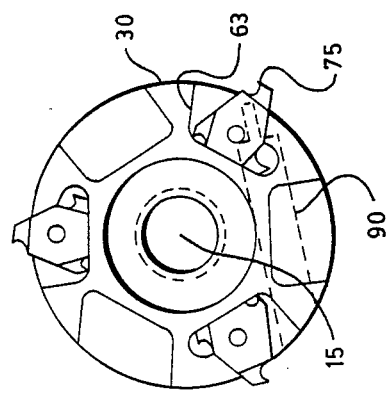
FIG. 3A is an axial view in the direction of line 1—1 of FIG. 2.

FIG. 3A illustrates the radial extension of cutting edges 75. Although the actual extension is subject to the desired depth of cut and the size of the insert a typical dimension for a 2.00 inch diameter body employing six inserts of 0.375 I.C. size would effect a 0.125 inch depth of cut. Other combinations readily known to those of ordinary skill in the art of insert size and body diameters may be used.

Referring to FIG. 2, internal cavity 60 is concentric with axis 15 and includes bore 80 and counter bore 85. Counter bore 85 is internally threaded for receipt of an axially oriented securing bolt 87 illustrated in FIG. 1.

Figure 3B:
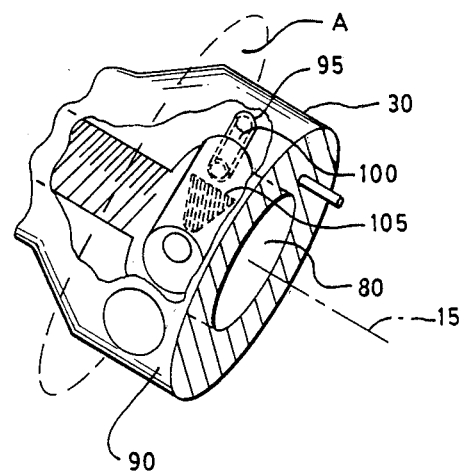
FIG. 3B is a cutaway perspective view of the base member of FIG. 1.
Figure 3C:
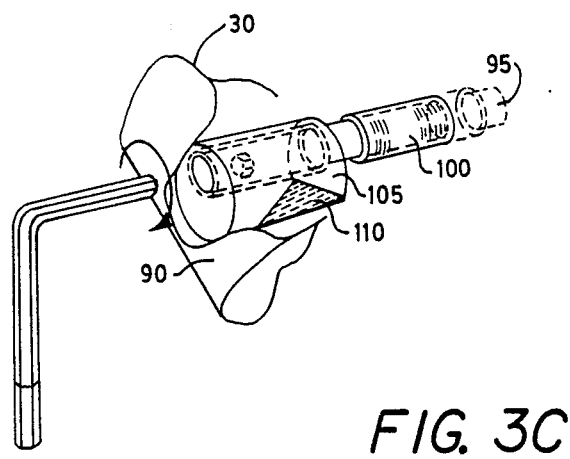
FIG. 3C is an enlargement of detail A of FIG. 3B.

Referring to FIGS. 3A-C, base member 30 further includes aperture 90, cylindrical in form and extending traverse with respect to axis 15. The aperture is counter bored at 95 and threaded for receipt of differential screw member 100. Aperture 90 intersects bore 80 to enable cam member 105 to communicate therewith. Cam member 105 is formed for travel within aperture 90 by means of differential screw 100 threaded within counter bore 95 and cam member 105. Movement of cam member 105 is accomplished by differential threading of screw 100. Insertion of a hexagonal head wrench, for example, into differential screw 100 and rotating, causes cam member 105 to travel axially within aperture 90. Cam member 105 includes a threaded section on its periphery 110 so that when the member traverses aperture 90 and intersects bore 80, a threaded surface is provided to sleeve 45.

Figure 4:
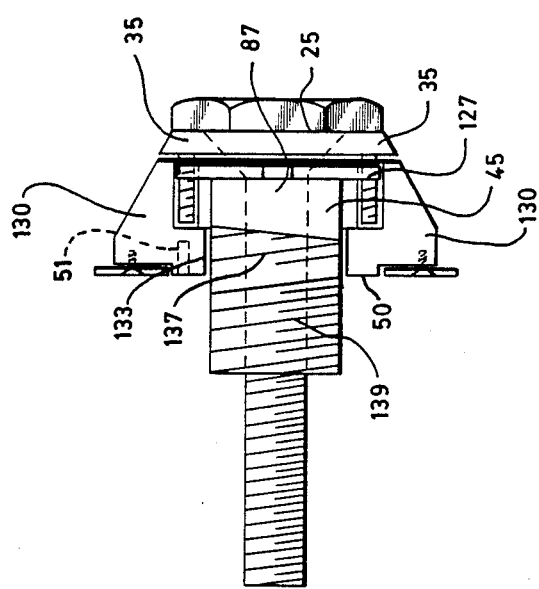
FIG. 4 is a side view through line 2—2 of FIG. 1.
Figure 7:
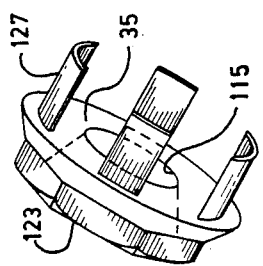
FIG. 7 is an axial view of the end cap as seen through line 2—2 of FIG. 6.

Referring to FIG. 4, adjustment head member 25 includes locking bolt 87, end cap 12035, sleeve 12545 and intermediate member 130.

Locking bolt 87 is of sufficient length to extend through head member 25 and into threading engagement within counter bore 85 thereby drawing head member 25 and base member 30 together.

Figure 6:
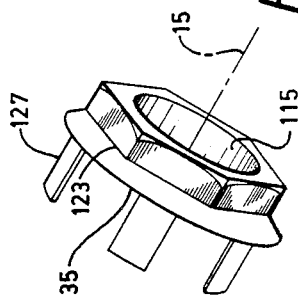
FIG. 6 is a perspective view of the end cap illustrated in FIG. 4.

Referring to FIG. 6, end cap 35 is generally a disk of wafer like form having concave and flat surfaces. The cap is graduated into increments and includes an aperture 115, oriented concentric with axis 15 for receipt of bolt 87. Concave surface 123 includes an external hexagonal surfacing for rotation by a hex wrench. Cap 35 further includes legs or tangs 127 extending rearwardly in the direction of arrow 135 (of FIG. 1) and substantially parallel with axis 15.

Figure 5:
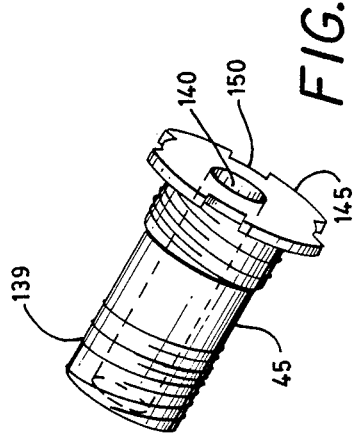
FIG. 5 is a side view of the sleeve member illustrated in FIG. 4.

Referring to FIG. 5, sleeve 45 is axially bored 140 and has a radially oriented flange 145 with apertures 150 for receipt of tangs 127. Rotation of end cap 35 by means of hex surfaces is communicated through tang members 127 to sleeve 45. Sleeve 45 is also threaded with forwardly disposed right hand threads of about 12 pitch and rearwardly disposed right hand threads of 20 pitch.

Intermediate member 130, as seen in FIG. 4, is axially bored 133 and threaded for engagement with the forwardly disposed exterior threading 137 of sleeve 45. The rearwardly disposed right hand threading 139 extends beyond first cutting face 50 and threadingly engages section 110 of cam member 105 within bore 80 (FIG. 3B).

Figure 8:
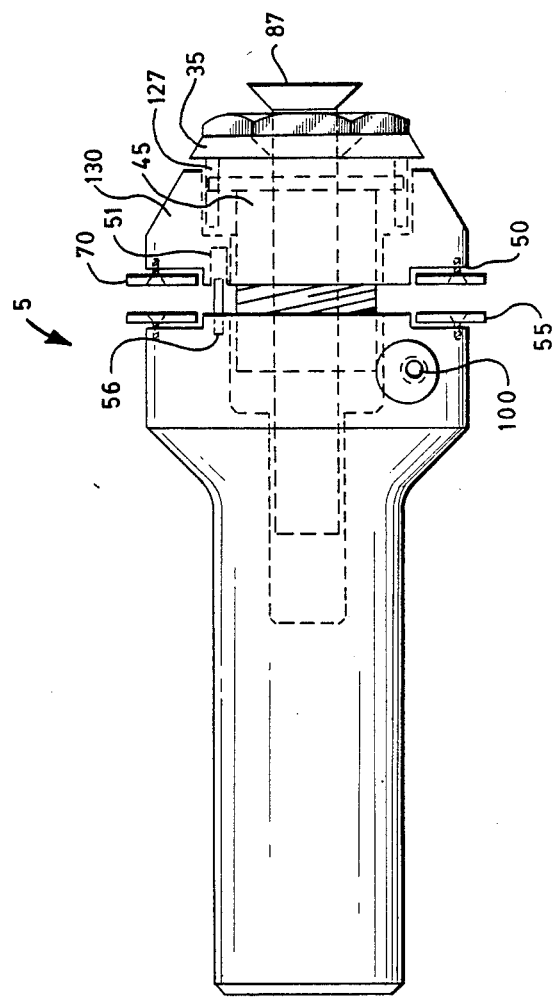
FIG. 8 is a perspective view of the embodiment of FIG. 1 where the cutting slot width has been expanded.

FIG. 8 depicts cutting tool 5 adjusted to provide an enlarged width slot. Although the tool may be adjusted through a range of from about 0.062 inches to about 0.250 inches when deploying an array of inserts, other embodiments are apparent to those of ordinary skill in the art. For example, by utilizing a 2.00 inch diameter tool body, with a 0.125 wide 0.12 inch depth of cut, with three inserts per cutting face, a slot width range from about 0.125 inches to about 0.250 inches is possible. Expanding the slot width outside the minimum width reduces the number of effective cutting teeth thereby decreasing cutting performance.

Adjustment of the present invention is readily accomplished by loosening locking bolt 87 and rotating end cap 45 a desired number of graduations by means of a hex wrench. The tangs 127 transfer the rotational motion to sleeve 145. The interaction of the 12 point pitch threading with the intermediate member 130 and the 20 point pitch threading with the cam member (not shown) either separate cutting faces 50, 55 expanding the cutting slot or draw the faces together narrowing the slot. Once the desired width is obtained, locking bolt 87 is resecured. A 5 degree rotation of sleeve 125 will cause an axial movement of about 0.00069 with respect to base member 30 and about 0.0011 with respect to intermediate member 130 resulting in a spread of 0.00046 inches.

Where the opposed cutting faces 50, 55 abut, the cutting tool is at a minimum slot width. Where three inserts are employed for each face, a total of six cutting tips at the minimum slot width operates with six effective cutting teeth. Where the same number of inserts are employed at the tools maximum slot width (0.25 inches), the cutter operates with 3 effective teeth.

Indexing the inserts 70 is also readily accomplished by first removing locking bolt 87 and then withdrawing cam member (not shown) by rotating differential screw 100 by a hex driver. The cam member is radially outward from bore 90. Sleeve member 125 is then easily removable from base member 30. The first and second cutting faces 50, 55 are then readily accessible for indexing of the inserts 70.

I claim:

1. An adjustable cutting tool for slot formation comprising:
   a body rotatable about an axis,
   said body having a head and base with opposed first and second cutter faces, respectively,
   said first and second cutter faces having recessed pockets concentrically spaced about said axis,
   a plurality of indexable inserts secured in said pockets,
   said head comprising an end cap, a sleeve member and an intermediate member,
   said base comprising a shank and an internal cavity extending axially from said second cutter face toward said shank, said first cutter faces formed on said intermediate member oriented generally normal to said axis, said intermediate member having an axially disposed bore, said sleeve threaded for differential engagement with said intermediate member bore and said internal cavity of said base, said sleeve further including recesses, said internal cavity including a bore concentric with said axis extending from said second cutter face rearwardly and a counter bore, said bore dimensioned for axial receipt of said sleeve member, means for threading engagement of said sleeve within said bore, means for connecting said end cap to said sleeve such that rotation of said end cap imparts rotational motion to said sleeve for axial adjustment of said cutter faces, and means extending through said sleeve for securing said axial adjustment.

2. The cutter tool of claim 1 wherein said first and second cutter faces include right and left hand inserts respectively.

3. The cutting tool of claim 2 wherein said inserts are generally of triangular form with positive rake cutting edges.

4. The cutting tool of claim 3 wherein said threaded sleeve includes right hand threading with 20 and 12 pitch.

5. The cutting tool of claim 4 wherein said means for connecting said end cap includes axially oriented leg members which engage said recesses in said sleeve.

6. The cutting tool of claim 5 wherein said means for threading said sleeve to said counter bore comprises an aperture extending transversely to said rotational axis and intersecting said bore, a differential screw and a cam member threaded at one end and having a centrally disposed bore threaded for receipt of said differential screw.

7. The cutting tool of claim 6 wherein said cam member is positioned within said aperture by said differential screw so to expose the threaded end to said sleeve.

8. The cutting tool of claim 7 wherein said threaded cam comprises a 20 pitch thread.

9. The cutting tool of claim 8 wherein said securing means comprises a locking bolt which axially traverses said head and threads into said base member, and a guide member which keys said head to said base member.

10. The cutting tool of claim 9 wherein said indexable inserts are secured within said recessed pockets by screws which traverse the inserts and thread into said first and second cutter faces.

11. An adjustable cutting tool for slot formation comprising:

a body rotatable about an axis, said body being of substantially cylindrical form and having a forwardly disposed adjustment head and a rearwardly disposed base separated by opposed first and second cutter faces, said first and second cutter faces having recessed pockets concentrically spaced about said axis, indexable inserts, secured in said pockets having radially extending cutting edges, said head comprising an end cap, a sleeve member and an intermediate member, said base having said second cutter face formed therein, a shank, and an internal cavity extending axially from said second cutter face toward said shank, said first cutter face, formed on said intermediate member, being oriented generally normal to said axis, said intermediate member having an axially disposed bore, said sleeve threaded for differential engagement with said intermediate member bore and said internal cavity of said base, said sleeve further including recipes, said internal cavity including a bore concentric with said axis extending from said second cutter face rearwardly and a counter bore, said bore dimensioned for axial receipt of said sleeve member, an aperture extending transversely to said rotational axis and intersecting with said bore, a cam member threaded at one end with a 20 pitch and having a centrally disposed bore threadedly receiving differential screw, said aperture counter bored for receipt of said differential screw, said end cap having axially oriented leg members which engage compatible said recesses in said sleeve for communicating rotational movement, a guide member which keys said head to said hose member and a locking bolt which axially traverses said adjustment head and threads into said base member to prevent slot width adjustment during operation.

* * * * *